US012572529B2

(12) United States Patent
Huang et al.

(10) Patent No.: US 12,572,529 B2
(45) Date of Patent: Mar. 10, 2026

(54) PRIORITY BASED MULTI-TASK MANAGEMENT METHOD AND SYSTEM

(71) Applicant: DENSO CORPORATION, Kariya-city (JP)

(72) Inventors: Haolun Huang, Kariya-city (JP); Xin Xu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 67 days.

(21) Appl. No.: 18/490,646

(22) Filed: Oct. 19, 2023

(65) Prior Publication Data

US 2025/0130990 A1 Apr. 24, 2025

(51) Int. Cl.
*G06F 16/23* (2019.01)

(52) U.S. Cl.
CPC ................................. *G06F 16/2379* (2019.01)

(58) Field of Classification Search
None
See application file for complete search history.

(56) References Cited

U.S. PATENT DOCUMENTS

| | | | |
|---|---|---|---|
| 10,579,424 B2 | 3/2020 | Goel et al. | |
| 11,897,357 B1 * | 2/2024 | Hinderer | G06F 9/5044 |
| 2015/0286504 A1 * | 10/2015 | Cao | G06F 9/5061 |
| | | | 718/104 |
| 2019/0354397 A1 * | 11/2019 | Goel | G06Q 20/02 |
| 2024/0126238 A1 * | 4/2024 | Kaliski | G06F 16/2358 |

OTHER PUBLICATIONS

P. Turner, B. B. Rao, N. Rao, "CPU bandwidth control for CFS", Proceedings of the Linux Symposium, Jul. 2009, pp. 11-20.

* cited by examiner

*Primary Examiner* — Taelor Kim
(74) *Attorney, Agent, or Firm* — Maschoff Brennan

(57) ABSTRACT

A method for managing a multi-task queue based on priority includes: receiving a plurality of tasks relating to data stored on a blockchain from a user, each of the plurality of tasks requiring one or more of necessary resource tickets to be executed by a processor in accordance with a burden caused by the task on the processor; identifying a priority of each of the plurality of tasks; assigning one or more of resource tickets for each of the plurality of tasks per unit time in accordance with the priority of each of the plurality of tasks; and executing one or more of the plurality of tasks per unit time if the one or more of resource tickets assigned for the one or more of the plurality of tasks is equal to or more than the one or more of necessary resource tickets.

15 Claims, 10 Drawing Sheets

FIG. 2

| TASK TYPES | DETAILS | PRIORITY TAG (PRIORITY LEVEL) | NECESSARY TICKETS | ASSIGNED TICKETS PER UNIT TIME |
|---|---|---|---|---|
| DATA QUERY TASK | DATA RETRIEVING FROM BC | FIRST PRIORITY (HIGH) | TWO | FOUR |
| DATA MANAGEMENT TASK | DATA UPLOADING AND RECORDING ON BC | SECOND PRIORITY (MIDDLE) | THREE | TWO |
| TAMPER PROOF CHECK TASK | TAMPER PROOF CHECKING ON DATA STORED ON BC | THIRD PRIORITY (LOW) | TWO | ONE |

FIG. 3A

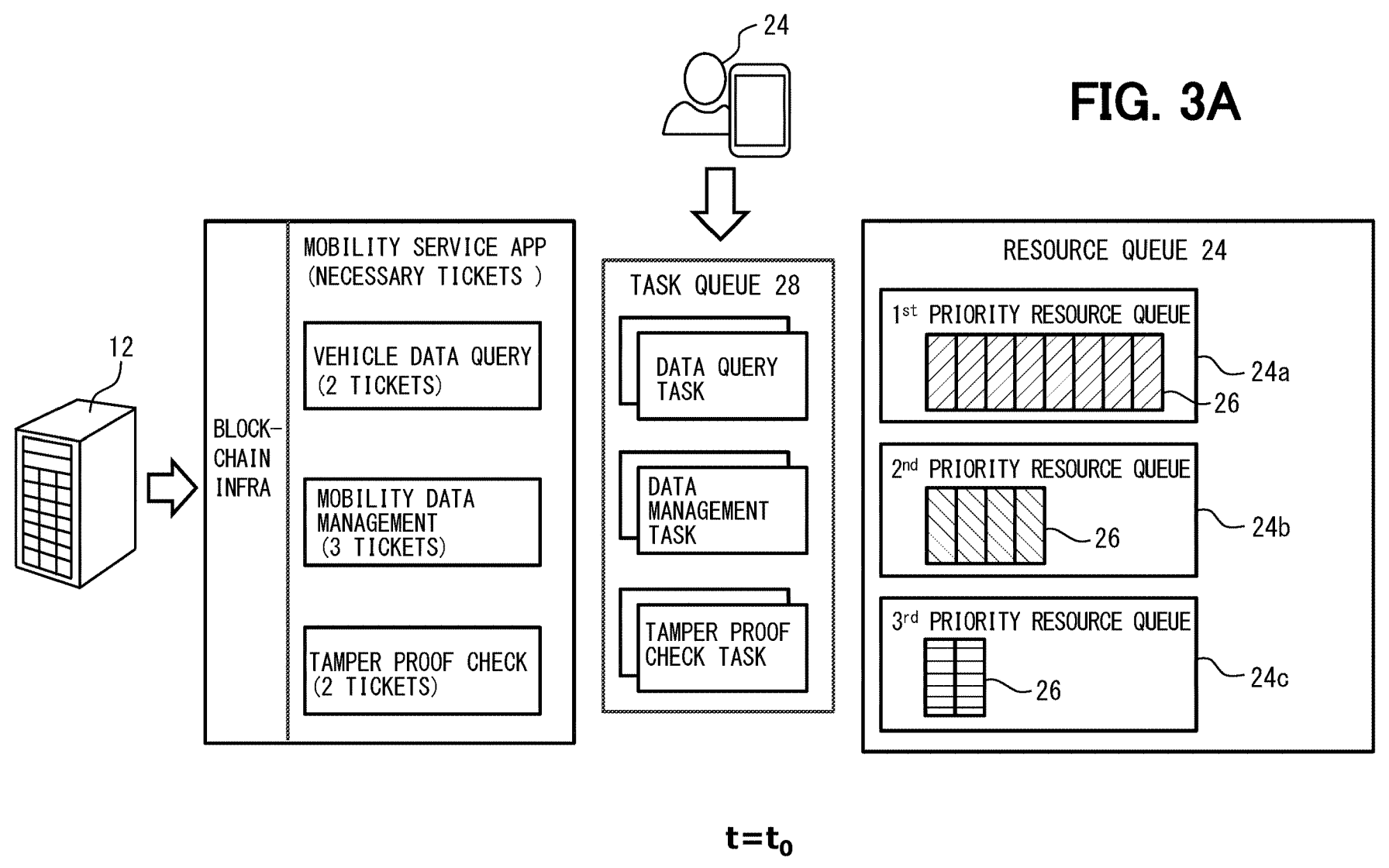

RESOURCE QUEUE 24

1st PRIORITY RESOURCE QUEUE — 24a / 26

2nd PRIORITY RESOURCE QUEUE — 24b / 26

3rd PRIORITY RESOURCE QUEUE — 24c / 26

24

TASK QUEUE 28

DATA QUERY TASK

DATA MANAGEMENT TASK

TAMPER PROOF CHECK TASK

MOBILITY SERVICE APP (NECESSARY TICKETS )

VEHICLE DATA QUERY (2 TICKETS)

MOBILITY DATA MANAGEMENT (3 TICKETS)

TAMPER PROOF CHECK (2 TICKETS)

BLOCK-CHAIN INFRA

12

$t=t_0$ t=t₆

PRIORITY BASED MULTI-TASK MANAGEMENT METHOD AND SYSTEM

TECHNICAL FIELD

This disclosure relates to a multi-task management method and system for managing multiple tasks based on priority.

BACKGROUND

Business entities or organizations have tried to share data to hatch new business and technology in industries. The accuracy for the stored data is significant to advance the progress in the fields. Blockchain technology using distributed data storage is one of several solutions to prevent data from illegally being changed after being sealed in the block.

A typical blockchain platform with smart contracts like Ethereum (registered trademark) is using the processing fee (called "GAS") attached to all the transactions to identify the application priority. Since all the transactions are issued anonymously on the public internet in such a permissionless-type blockchain, users need to pay more if they want to dispose of the transaction with a better response time. At the same time, a transaction fee would also prevent malicious users from breaking the blockchain system.

SUMMARY

According to one aspect of the present disclosure, a method for managing a multi-task queue based on priority includes: receiving a plurality of tasks relating to data stored on a blockchain from a user, each of the plurality of tasks requiring one or more of necessary resource tickets to be executed by a processor in accordance with a burden caused by the task on the processor; identifying a priority of each of the plurality of tasks; assigning one or more of resource tickets for each of the plurality of tasks per unit time in accordance with the priority of each of the plurality of tasks; and executing one or more of the plurality of tasks per unit time if the one or more of resource tickets assigned for the one or more of the plurality of tasks is equal to or more than the one or more of necessary resource tickets. An amount of the resource tickets assigned for each of the plurality of tasks increases as the priority of each of the plurality of tasks increases.

BRIEF DESCRIPTION OF DRAWINGS

FIG. 2 is a table showing task types, given priorities, necessary tickets, and assigned tickets per unit time;

FIGS. 3A to 3G show the entire processes of managing a multi-task queue at timings t=$t_0$ to $t_6$.

DETAILED DESCRIPTION

Figure 1:
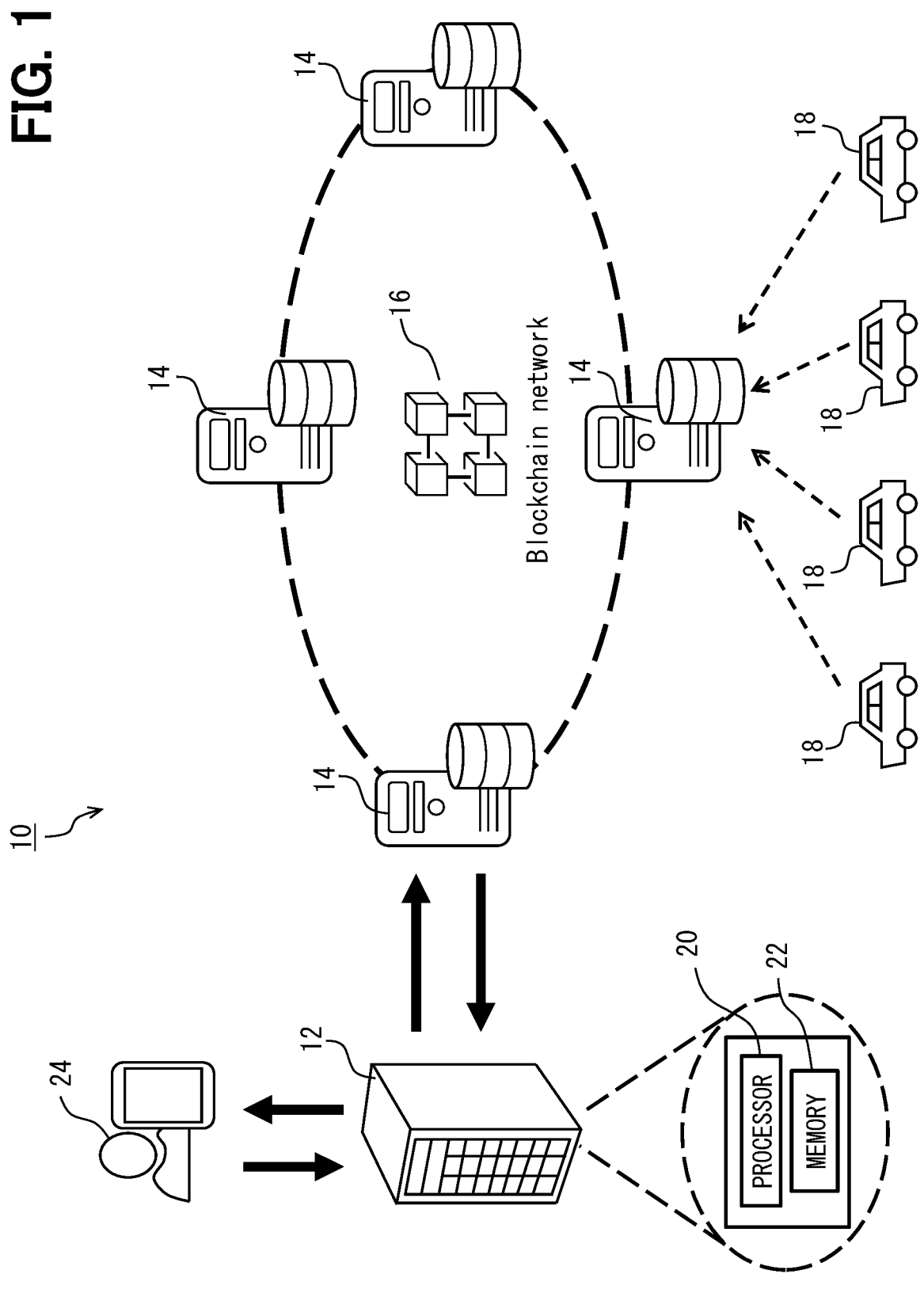
FIG. 1 is a block diagram illustrating the entire configuration of a multi-task management system according to one embodiment.

To begin with, a relevant technology will be described first only for understanding the following embodiment. In the Ethereum using GAS economy model, the task with higher GAS fee would be processed with higher priority. However, the transaction might need to wait in the queue for a long time if attached GAS fee is low. It would be also difficult to estimate the ratio between execution time and GAS cost for large use cases in order to keep the stability in the service.

A first aspect of the present disclosure is a method for managing a multi-task queue based on priority includes: receiving a plurality of tasks relating to data stored on a blockchain from a user, each of the plurality of tasks requiring one or more of necessary resource tickets to be executed by a processor in accordance with a burden caused by the task on the processor; identifying a priority of each of the plurality of tasks; assigning one or more of resource tickets for each of the plurality of tasks per unit time in accordance with the priority of each of the plurality of tasks; and executing one or more of the plurality of tasks per unit time if the one or more of resource tickets assigned for the one or more of the plurality of tasks is equal to or more than the one or more of necessary resource tickets. An amount of the resource tickets assigned for each of the plurality of tasks increases as the priority of each of the plurality of tasks increases.

A second aspect of the present disclosure is a multi-task queue management system including: a storage server that is configured to store data on a blockchain; and a management server that is configured to manage a plurality of tasks relating the data stored on the blockchain. The management server includes at least one processor programmed to: receive the plurality of tasks from a user, each of the plurality of tasks requiring one or more of necessary resource tickets to be executed by the at least one processor in accordance with a burden caused by the task on the at least one processor; identify a priority of each of the plurality of tasks; assign one or more of resource tickets for each of the plurality of tasks per unit time in accordance with the priority of each of the plurality of tasks; and execute one or more of the plurality of tasks per unit time if the one or more of the resource tickets assigned for the one or more of the plurality of tasks are equal to or more than the one or more of necessary resource tickets. The at least one processor is further programmed to increase an amount of the resource tickets assigned for each of the plurality of tasks as the priority of each of the plurality of tasks increases.

A third aspect of the present disclosure is a non-transitory, computer readable, tangible storage medium storing a program for managing a multi-task queue. The program, when executed by at least one processor, causes the at least one processor to perform: receiving a plurality of tasks relating to data stored on a blockchain from a user, each of the plurality of tasks requiring one or more of necessary resource tickets to be executed by the at least one processor in accordance with a burden caused by the task on the at least one processor; identifying a priority of each of the plurality of tasks; assigning one or more of resource tickets for each of the plurality of tasks per unit time in accordance with the priority of each of the plurality of tasks; and executing one or more of the plurality of tasks per unit time if the one or more of resource tickets assigned for the one or more of the plurality of tasks are equal to or more than the necessary resource tickets. The program further causes the at least one processor to perform increasing an amount of the resource tickets assigned for each of the plurality of tasks as the priority of each of the plurality of tasks increases.

Next, an embodiment of the present disclosure will be described below with reference to the drawings.

FIG. 1 shows a diagram schematically illustrating one example of a multi-task queue management system (hereinafter, referred to as a "system") 10 according to the present embodiment. The system 10 is configured to manage a plurality of tasks input to a management server 12 based on priority given to each of the plurality of tasks. The system 10 includes storage servers (nodes) 14 and the management server 12. In this embodiment, a plurality of storage servers 14 ("4" storage servers 14 are illustrated in FIG. 1 but not necessarily limited to the number of the storage servers 14) are provided to constitute a blockchain network 16. That is, each of the storage servers 14 serves as a node for the blockchain network 16. In this embodiment, the storage servers 14 form a private-type or consortium-type block-chain network 16 and each of the storage servers 14 belongs to an organization such as a corporation or business entity. The storage servers 14 have been authorized or permitted to join the blockchain network 16 as a node. In other words, the storage servers 14 are nodes for a permissioned-type block-chain. For example, the storage servers 14 may be automakers (OEMs), insurance companies, repair shops (dealers), and so on.

Each of the storage servers 14 includes at least one processor (not illustrated) and at least one memory (not illustrated) instead of, or in combination of, at least one circuit in this embodiment. The memory includes random access memory, read only memory, flash memory, or a combination of these. The memory has stored thereon instructions which, when executed by the processor, cause the processor to perform a variety of tasks. Each storage server 14 commonly stores, in its memory, a blockchain on which a variety type of data is stored and recorded. In this embodiment, the data stored on the blockchain includes vehicle data that is collected from a plurality of vehicles 18 which also join the system 10. For example, as vehicle data, vehicle sensor data (odometer, temperature, acceleration, location, vehicle data record, and in-vehicle image sensor data etc.), transactions (e.g. vehicle owner payment for parking, charger plug, vehicle transactions with other vehicles) may be collected and stored on the blockchain. The vehicle data is wirelessly uploaded to the blockchain network 16 from each vehicle 18 via, e.g., V2V communication, V2X communication, the internet, cellular communication, and so on.

The management server 12 is a server that is configured to manage a multi-task queue based on priority of each of the plurality of tasks. As shown in FIG. 1, the management server 12 includes at least one processor 20 and at least one memory 22 instead of, or in combination of, at least one circuit in this embodiment. The memory 22 is a non-transitory, computer readable, tangible storage medium and includes random access memory, read only memory, flash memory, or a combination of these. The memory 22 has stored thereon instructions which, when executed by the processor 20, cause the processor 20 to perform a variety of tasks. In other words, the processor 20 performs smart contracts to executes a variety type of tasks by executing the programs stored in the memory 22. In this embodiment, the management server 12 receives one or more of tasks from users 24 and puts the one or more of task in a task queue 28 (see FIG. 3A). If the management server 12 receives multiple tasks from users 24 at the same time, the management server 12 is configured to execute each of the multiple tasks in accordance with the priority of each of the tasks, which will be described later. In other words, the management server 12 executes smart contracts to perform the tasks in an order with higher priority given to each of the tasks.

Tasks executed by the management server 12 include a variety of types of tasks in association with data stored on the blockchain. For example, the tasks may be categorized into three types of tasks, (i) storing and recording data on the blockchain after verification processes of the data (i.e., a consensus algorithm), (ii) retrieving data from the block-chain in response to a user request, and (iii) other back-ground tasks (e.g., data tamper proof check on the block-chain). Hereinafter, tasks categorized into the type (i) may be referred to as a "data management task", tasks catego-rized into the type (ii) may be referred to as a "data query task", and tasks categorized into the type (iii) may be referred to as a "tamper proof check task."

Each task has priority to be executed by the management server 12 (more specifically, the processor 20 of the man-agement server 12). In this embodiment, three levels of priority, a first priority, a second priority, and a third priority, are defined. The first priority is highest among the three levels, and the second priority follows the first priority. The third priority is lowest among the three priority levels. However, the priority levels are not necessarily limited to the three levels, and may have two levels or four or more levels in accordance with types of tasks. One of the three priorities has been given to each task in advance. More specifically, a priority tag is used to indicate which priority the task has. The priority tag is reprogrammed in each task by a developer (and may be changed or modified by an administrator of the management server 12 in view of the effectiveness of the system operation).

For example, the data query task as described above typically requires a quick response for users 24 to improve user experience. Therefore, as shown in FIG. 2, the first priority may be given to the data query task to be executed by the management server 12 with the highest priority over other types of tasks. The data management task may be categorized as an intermediate priority task because upload-ing and recording data on the blockchain may not require a quick response as compared to the data query task. Thus, the second priority may be given to the data management task to be executed next to the data query task. The tamper proof check task does not usually require a quick response and should be done in background of the system. Therefore, the lowest priority (i.e., the third priority) may be given to the tamper proof check task.

In this embodiment, the users 24 may be a person who is authorized to use the system to obtain the data from the blockchain. Each personal user 24 is allowed to make a request via a device such as a mobile terminal device or a personal computer to obtain the data stored on the block-chain. The users 24 also include the administrator of the management server 12 to conduct the tamper proof check as described above at a predetermined timing (for example, weekly or monthly). Furthermore, the users 24 may include the vehicles 18 (or drivers) that provide the vehicle data for the system 10. For example, the vehicle 18 may make a request, as a user, to upload and record the vehicle data on the blockchain when the vehicle data is collected. That is, the vehicle 18 may request for the data management task as a user 24.

The management server 12 (the processor 20) has a function to manage a plurality of tasks by assigning its computer resources of the processor 20 for the received tasks based on the priority given to each task. In this embodiment, this computer resource management is per-formed by introducing a "resource ticket concept". A single ticket indicates a computer resource unit and the number of the tickets represents a computer resource amount. Each task requires predetermined computer resources (in other words, necessary resource tickets) in accordance with its burden on the processor 20 that is caused during execution of the task. For example, if the data query task requires two computer resource units of the processor 20 to be executed, the data query task requires two necessary resource tickets to be executed by the processor 20. On the other hand, if the data management task requires, for example, three computer resource units of the processor 20, three necessary resource tickets are required to execute the data management task. Furthermore, if the tamper proof check task also requires two computer resource units of the processor 20 to be executed, two necessary resource tickets are required to execute the tamper proof check task.

Furthermore, in this embodiment, a resource queue 24 is defined in the processor 20 of the management server 12. As shown in FIG. 3A, the resource queue 24 includes three resource queues 24a, 24b, 24c, a first priority resource queue 24a, a second priority resource queue 24b, and a third priority resource queue 24c, and the total computer resource of the processor 20 is represented by, for example, fourteen resource tickets 26. The largest number of the resource tickets 26 is given to the first priority resource queue 24a, which is used for executing the first priority task (i.e., the data query task in this embodiment). In this embodiment, the first priority resource queue 24a holds at most eight resource tickets 26. The middle size number of the resource tickets 26 is given to the second priority resource queue 24b, which is used for executing the second priority task (i.e., the data management task in this embodiment). The second priority resource queue 24b holds, for example, at most four resource tickets 26. The smallest number of the resource tickets 26 is given to the third priority resource queue 24c, which is used for executing the third priority task (i.e., the tamper proof check task in this embodiment). The third priority resource queue 24c holds, for example, at most two resource tickets 26. It should be noted the maximum number of the resource tickets 26 is given to each of the first priority resource queue 24a, the second priority resource queue 24b, and the third priority resource queue 24c during an initialization process (i.e., when booting up the management server 12 to perform a multi-task queue process, which will be descried later).

The management server 12 assigns one or more of resource tickets 26 to each resource queue 24a, 24b, 24c per unit time (e.g., every second) in accordance with the corresponding priority of the task. The management server 12 increases the number (amount) of the resource tickets 26 assigned to each resource queue 24a, 24b, 24c per unit time, as the corresponding priority level given to the task increases. Here, as described above, the data query task has the highest priority (i.e., the first priority), and therefore the management server 12 assigns, per unit time, the largest number of the resource tickets 26 to the first priority resource queue 24a that is used for executing the data query task. For example, the management server 12 allocates four resource tickets 26 (N=4) to the first priority resource queue 24a every second. The data management task has the middle priority (i.e., the second priority), and thus the management server 12 assigns, per unit time, an intermediate number of the resource tickets 26 to the second priority resource queue 24b that is used for executing the data management task. For example, the management server 12 allocates two resource tickets 26 (N/2) to the second priority resource queue 24b every second. Lastly, since the tamper proof check task has the lowest priority (i.e., the third priority), the management server 12 assigns, per unit time, the lowest number of the resource tickets 26 to the third priority resource queue 24c that is used for executing the tamper proof check task. For example, the management server 12 allocates one resource ticket 26 (N/4) to the third priority resource queue 24c every second.

The management server 12 executes the task by executing the smart contracts if the corresponding resource queue 24a, 24b, 24c has the assigned tickets 26 that is equal to or greater than the necessary resource tickets for the task. For example, if the task queue 28 has a single data query task that requires two necessary resource tickets and the first priority resource queue 24a has eight resource tickets 26, the management server 12 executes the data query task. On the contrary, if the first priority resource queue 24a has only one resource ticket 26, the management server 12 does not execute the data query task in the task queue 28 and wait until the first priority resource queue 24a holds two or more resource tickets 26. It should be noted that if two data query tasks are in the task queue 28 and the first priority resource queue 24a has four or more resource tickets 26, the management server 12 executes the two data query tasks at the same time.

(Multi-Task Management Process)

Figure 3B:
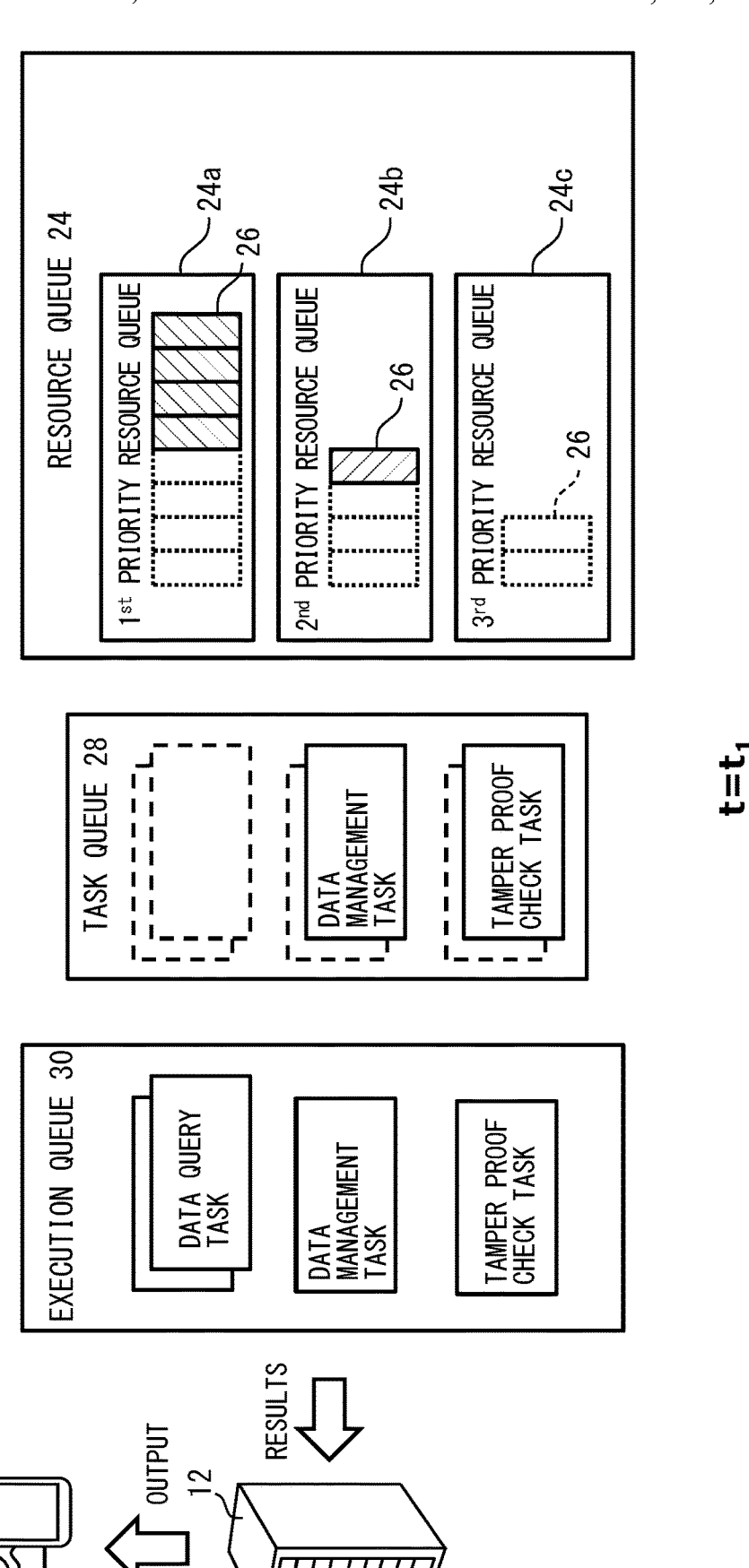
Figure 3C:
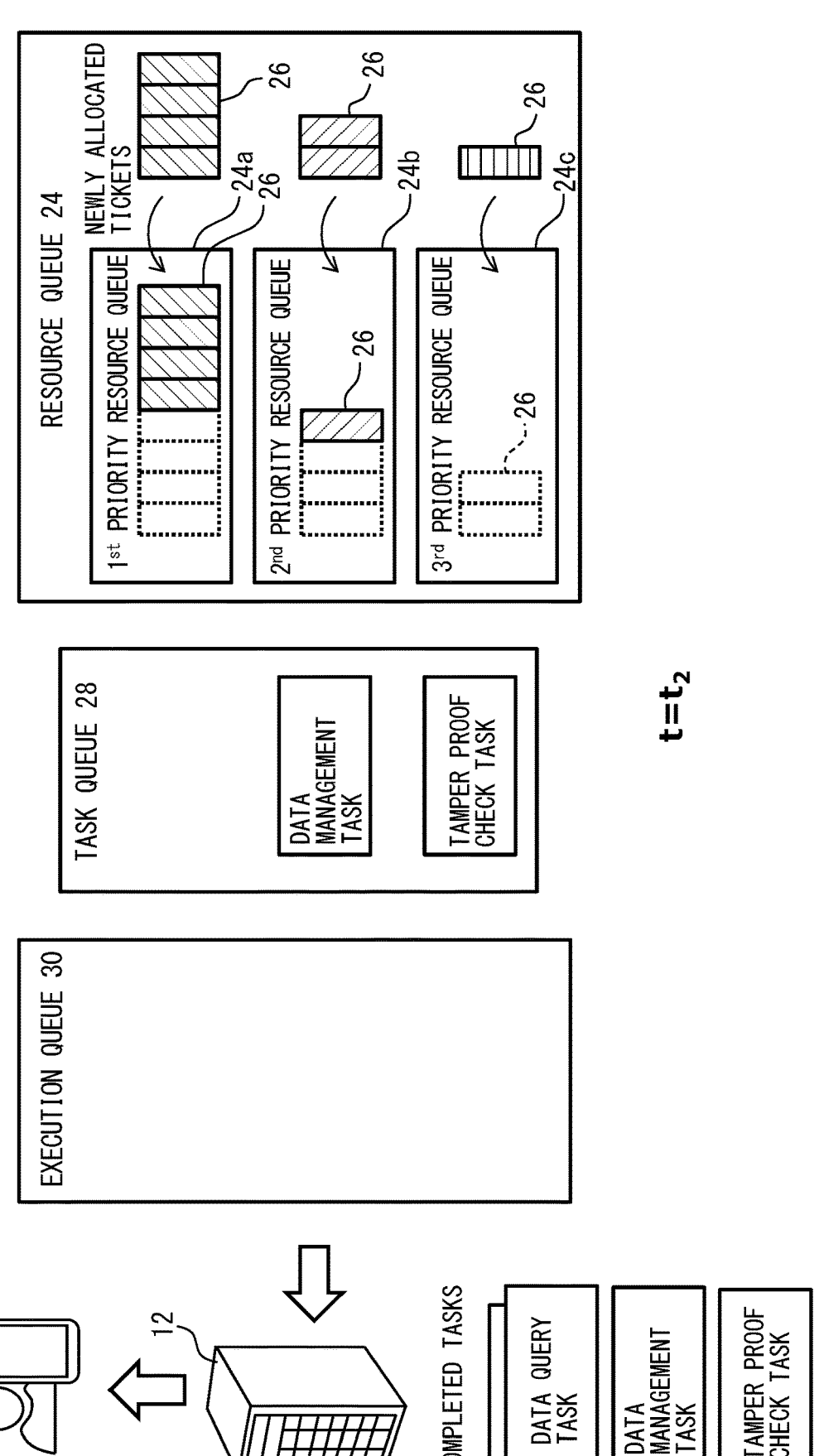
Figure 3D:
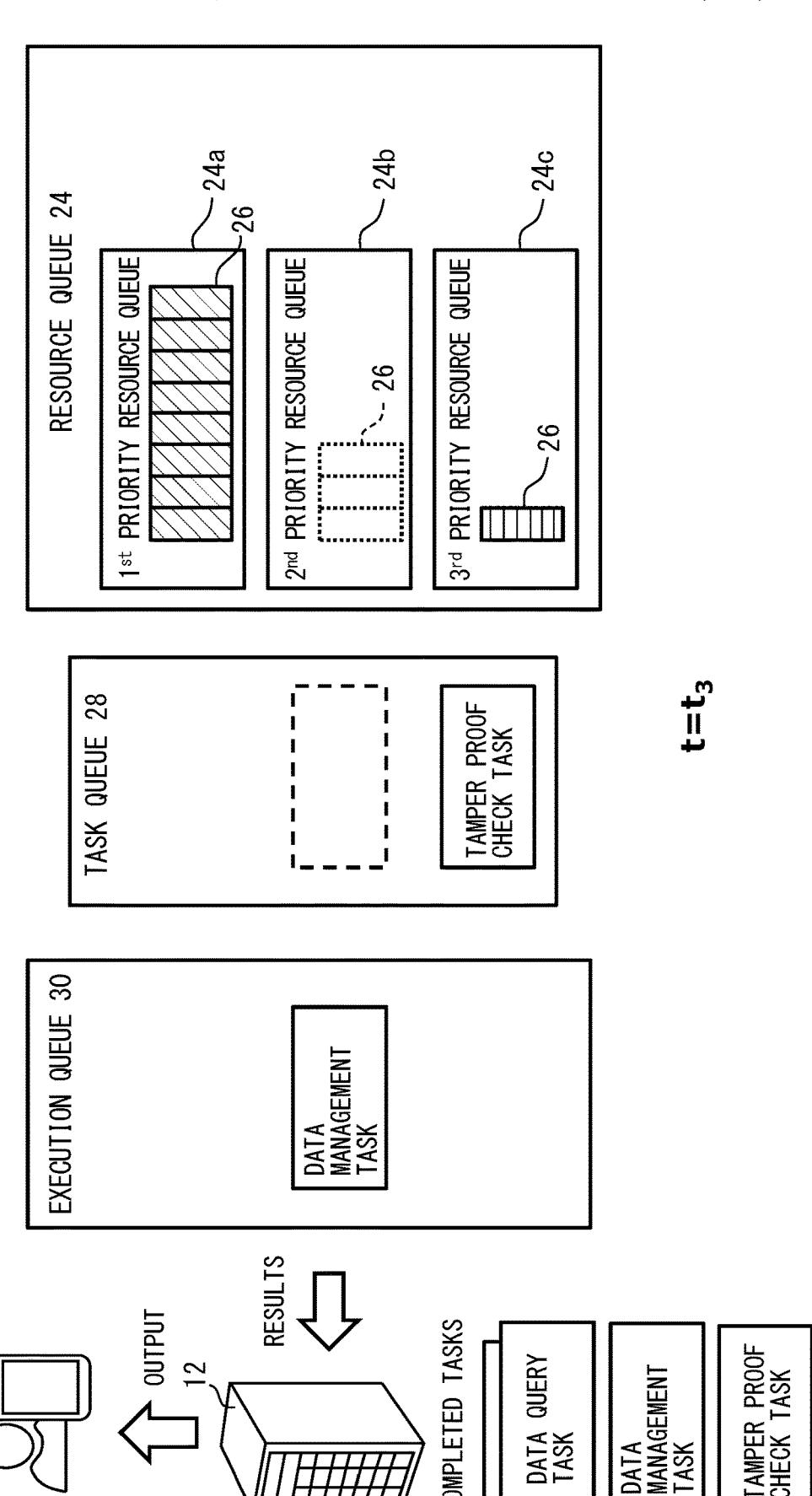

Next, the muti-task management process will be described with reference to FIGS. 3A-3G and FIG. 4. FIGS. 3A-3G show conceptual diagrams of the entire process of managing the multi-task queue and FIG. 4 shows a flowchart of steps that are executed by the management server 12 (i.e., the processor 20) during the multi-task management process. In this example, the users 24 transmit a plurality of tasks to the management server 12 at the same time. The tasks are, for example, two data query tasks, two data management tasks, and two tamper proof check tasks as shown in FIG. 3A. It is assumed that each of the data query tasks requires two necessary resource tickets, each of the data management tasks requires three necessary resource tickets, and each tamper proof check tasks requires two necessary resource tickets to be executed by the processor 20 of the management server 12.

It should be noted that when the management server 12 is booted up, the resource queue 24 is initialized by allocating a predetermined number of resource tickets 26 to each priority resource queue 24a, 24b, 25c. In this example, as shown in FIG. 3A, eight resource tickets 26 are allocated to the first priority resource queue 24a, four resource tickets 26 are allocated to the second priority resource queue 24b, and two resource tickets 26 are allocated to the third priority resource queue 24c when booting-up the management server 12.

When the management server 12 (the processor 20) receives the tasks from the users 24 (S100), the management server 12 starts the multi-task management process (see also FIG. 3A showing the process at $t=t_0$). The received tasks are put in the task queue 28 as shown in FIG. 3A. Upon receiving the tasks from the users 24, the management server 12 determines whether the priority tag is attached to each of the tasks and identifies the priority of each task based on the attached priority tags at S110. If there is a task without the priority tag (i.e., an error is detected), the process proceeds to S120 and the management server 12 attaches a lowest priority (i.e., the third priority) to the task. Then, the process proceeds to S130. On the contrary, if all the tasks have the priority tags, the process proceeds to S130 after identifying all the priorities of the tasks.

At S130, the management server 12 determines whether the resource tickets 26 in each priority resource queue 24a, 24b, 24c are equal to or greater than the necessary resource tickets for the corresponding task. As described above, the first priority resource queue 24a has eight resource tickets 26 and there are two data query tasks each requiring two necessary resource tickets in the task queue 28. Therefore, the number of the resource tickets 26 (i.e., 8) in the first priority resource queue 24*a* are greater than the total necessary resource tickets (i.e., 4) required for executing the two data query tasks. Thus, as for the data query tasks, the management server 12 determines that S130 is satisfied as to all the data query tasks (S130: YES). Then, the process proceeds to S140.

As for the data management tasks each of which requires three necessary resource tickets, four resource tickets 26 are allocated to the second priority resource queue 24*b* as shown in FIG. 3A. Therefore, only one data management task can be executed with the four resource tickets 26 in the second priority resource queue 24*b* at this moment. Therefore, the management server 12 determines that the allocated resource tickets 26 are greater than the necessary resource tickets only for one data management task among the two data management tasks at S130. Then, the process proceeds to S140. On the other hand, as for the other data management task in the task queue, the management server 12 determines that S130 is not satisfied (S130: NO). Therefore, the process as to the other data management task proceeds to S150. Similarly, as for the temper proof check tasks each of which requires two necessary resource tickets, two resource tickets 26 are allocated to the third priority resource queue 24*c*. Thus, the management server 12 determines that the allocated resource tickets 26 are greater than the necessary resource tickets only for one tamper proof check task among the two tamper proof check tasks at S130. On the contrary, as for the other tamper proof check task, the management server 12 determines that S130 is not satisfied, and thus the process as to the other tamper proof check task proceeds to S150.

At S140, the management server 12 executes the tasks which satisfy S130. As shown in FIG. 3B (t=t$_1$), two data query tasks are put in an execution queue 30 and the processor 20 of the management server 12 executes the two data query tasks at the same time using the four resource tickets 26. As a result, the four resource tickets 26 are remained in the first priority resource queue 24*a*. By executing the two data query tasks, the management server 12 retrieves, via one or more of the storage servers 14, the vehicle data from the blockchain. Then, the management server 12 provides the retrieved vehicle data to the users 24 who made requests for the data query tasks. In this way, the data query tasks are given the highest priority (the first priority) and the management server 12 processes the two data query tasks at the same time. Thus, the users 24 can quickly receive the vehicle data as requested.

As for the data management tasks, one of them is put in the execution queue 30 and the processor 20 executes the one data management task using the three resource tickets 26. The other of the two data management tasks is left in the task queue 28 as shown in FIG. 3B. As a result, only one resource ticket 26 is left in the second priority resource queue 24*b*. By executing the data management task, the vehicle data collected from the vehicles 18 are stored and recorded on the blockchain after verification processes by the nodes (i.e., the storage servers 14). Similarly, one of the two tamper proof check tasks is put in the execution queue 30 and the processor 20 executes the one tamper proof check task using two resource tickets 26. The other one of the tamper proof check tasks is left in the task queue 28. By executing the tamper proof check task, tamper proof on the data stored on the blockchain is confirmed. As a result, no resource ticket 26 is left in the third priority resource queue 24*c*. In this way, the management server 12 executes only one data management task and only one tamper proof check task, each of which has a lower priority than the data query task. In other words, the management server 12 preferentially executes the data query tasks with higher priority by allocating more computer resources for the data query tasks than for the other tasks. However, although the tamper proof check task has the lowest priority, the tamper proof check task is executed at this time. Therefore, the lowest priority task can be executed without waiting for a long time.

After completing the tasks at S140, the management server 12 allocates new resource tickets 26 in each resource queue 24*a*, 24*b*, 24*c* at S150. In this example, four resource tickets 26 are newly allocated to the first priority resource queue 24*a* as shown in FIG. 3C (t=t$_2$). As a result, the first priority resource queue 24*a* has eight resource tickets 26 in total. Further, two resource tickets 26 are newly allocated to the second priority resource queue 24*b*, and thus the second priority resource queue 24*b* has three resource tickets 26 in total. Furthermore, one resource ticket 26 is newly allocated to the third priority resource queue 24*c*, and as a result, the third priority resource queue 24*c* includes one resource ticket 26. In this way, the management server 12 newly allocates more resource tickets 26 to the first priority resource queue 24*a* than other two priority resource queues 24*b*, 24*c*. Therefore, the task with higher priority can be executed more preferentially than other tasks with lower priority.

Next, the management server 12 determines whether all tasks are completed at S160. Since the task queue 28 still has two unexecuted tasks (i.e., one data management task and one tamper proof check task as shown in FIG. 3C), the process returns back to S130. At S130, the management server 12 again determines whether the allocated resource tickets 26 for each of the tasks are equal to or greater than the necessary resource tickets for the corresponding task. In this example, since the second priority resource queue 24*b* holds three resource tickets 26 as shown in FIG. 3C, the data management task in the task queue 28 satisfies S130, and thus the management server 12 executes the data management task using the three resource tickets 26 at S140 (see FIG. 3D (t=t$_3$)). By executing the data management task, the vehicle data collected and uploaded from the vehicles 18 are recorded after verification processes. On the contrary, as for the tamper proof check task in the task queue 28, the third priority resource queue 24*c* only holds one resource ticket 26 at this moment. Therefore, S130 is determined to be not satisfied and the tamper proof check task is left in the task queue 28 (i.e., the process proceeds to S150 without executing the tamper proof check task). In this way, the data management task, which has higher priority than the tamper proof check task, can be preferentially executed over the tamper proof check task.

Figure 3E:
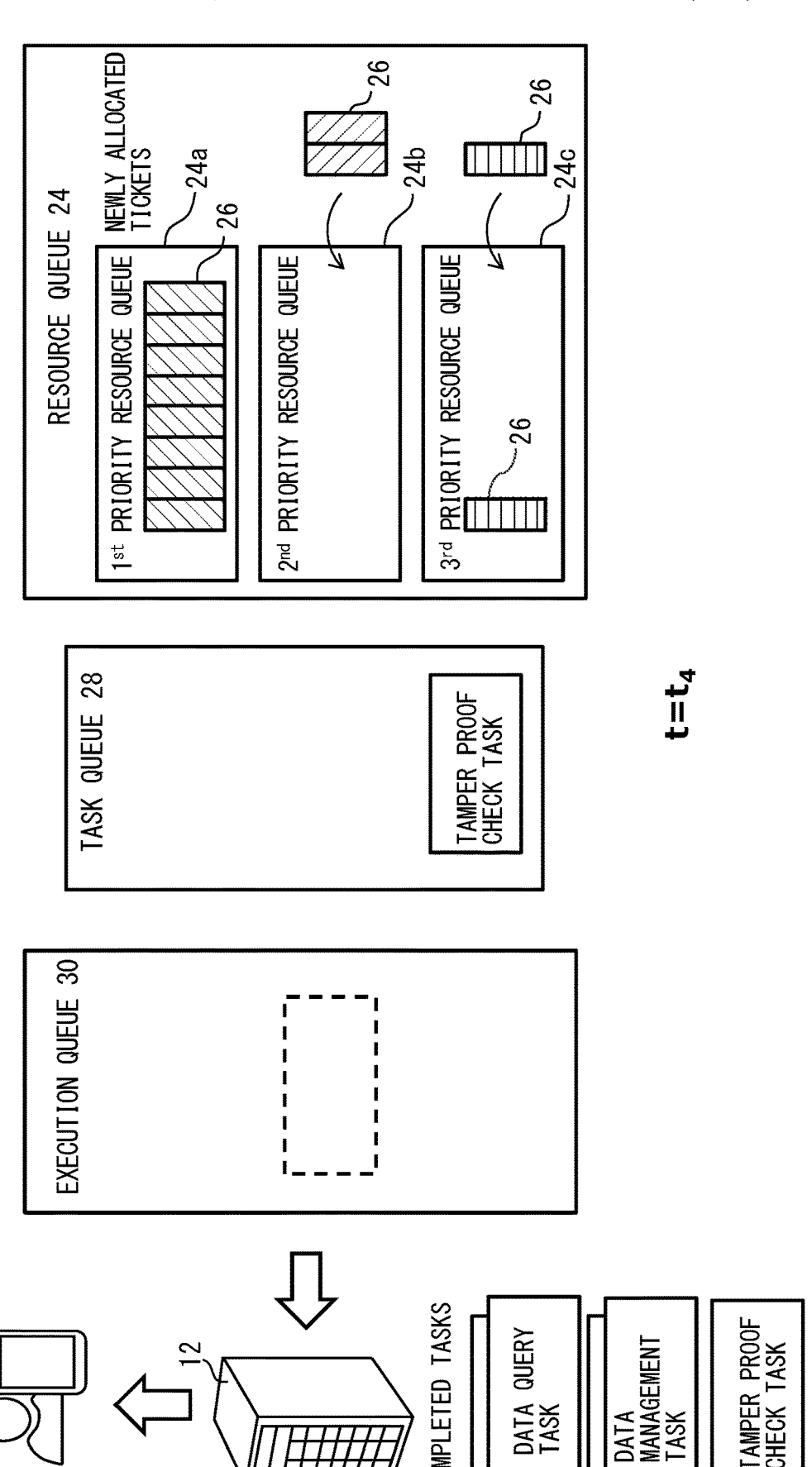
Figure 4:
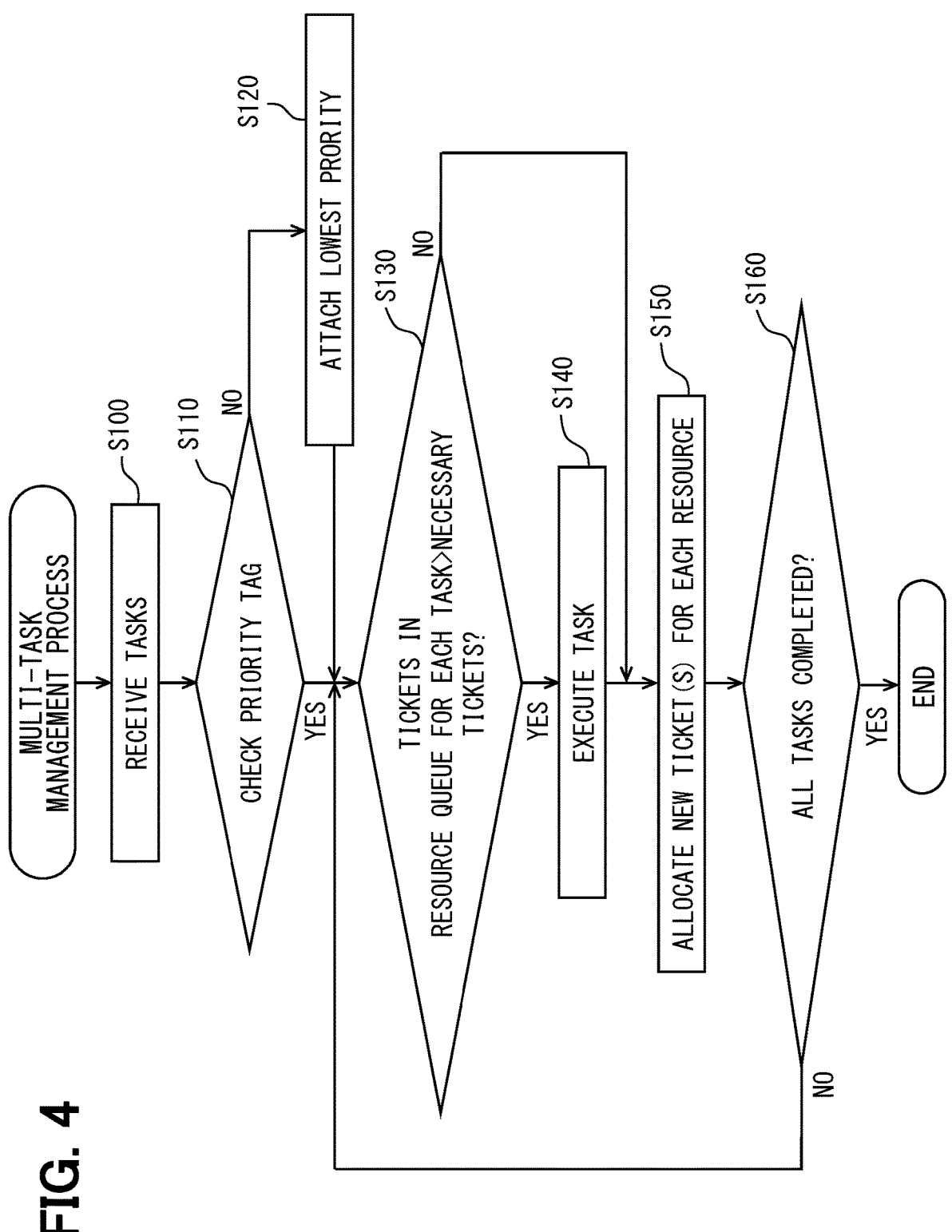
FIG. 4 shows a flowchart of a multi-task management process executed by a processor of a management server.

Then, at S150, new resource tickets 26 are allocated again in the resource queue 24*a*, 24*b*, 24*c* as shown in FIG. 3E (t=t$_4$). At this point, two resource tickets 26 are allocated to the second priority resource queue 24*b* and one resource ticket 26 is allocated to the third priority resource queue 24*c*. As a result, the second priority resource queue 24*b* holds two resource tickets 26 and the third priority resource queue 24*c* holds two resource tickets 26. In this way, the management server 12 allocates more the resource tickets 26 to the second priority resource queue 24*b* than to the third priority resource queue 24*c*. Thus, the data management task, which has higher priority than the tamper proof check task, can be preferentially executed over the tamper proof check task. It should be noted that since the first priority resource queue 24*a* has already the maximum number of the resource tickets 26 (i.e., eight resource tickets 26) at this moment, no resource ticket 26 is newly allocated to the first priority resource queue 24*a*. Next, the process proceeds to S160 and, since all the tasks are not completed (S160: NO), the process returns back to S130.

Figure 3F:
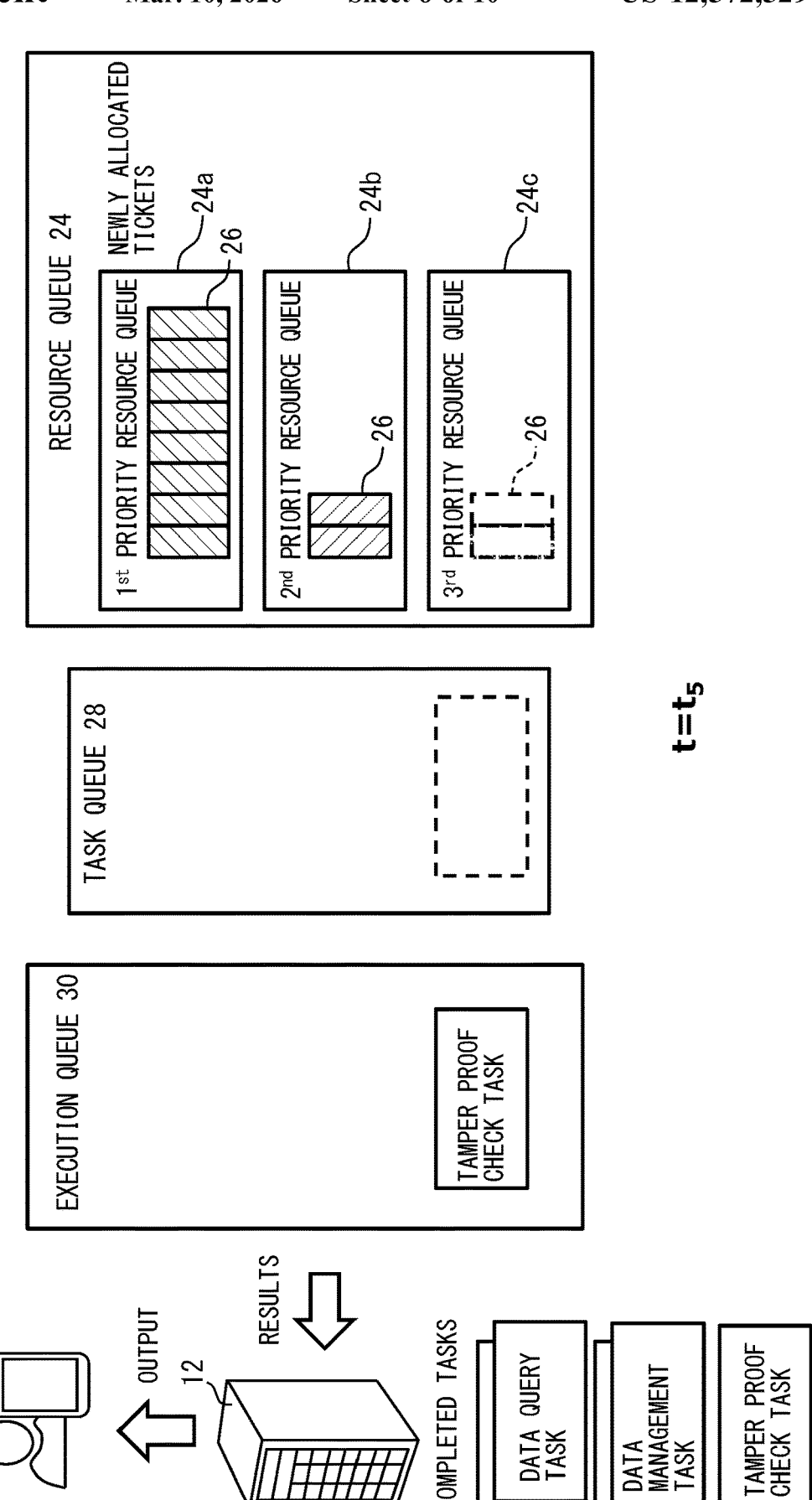
Figure 3G:
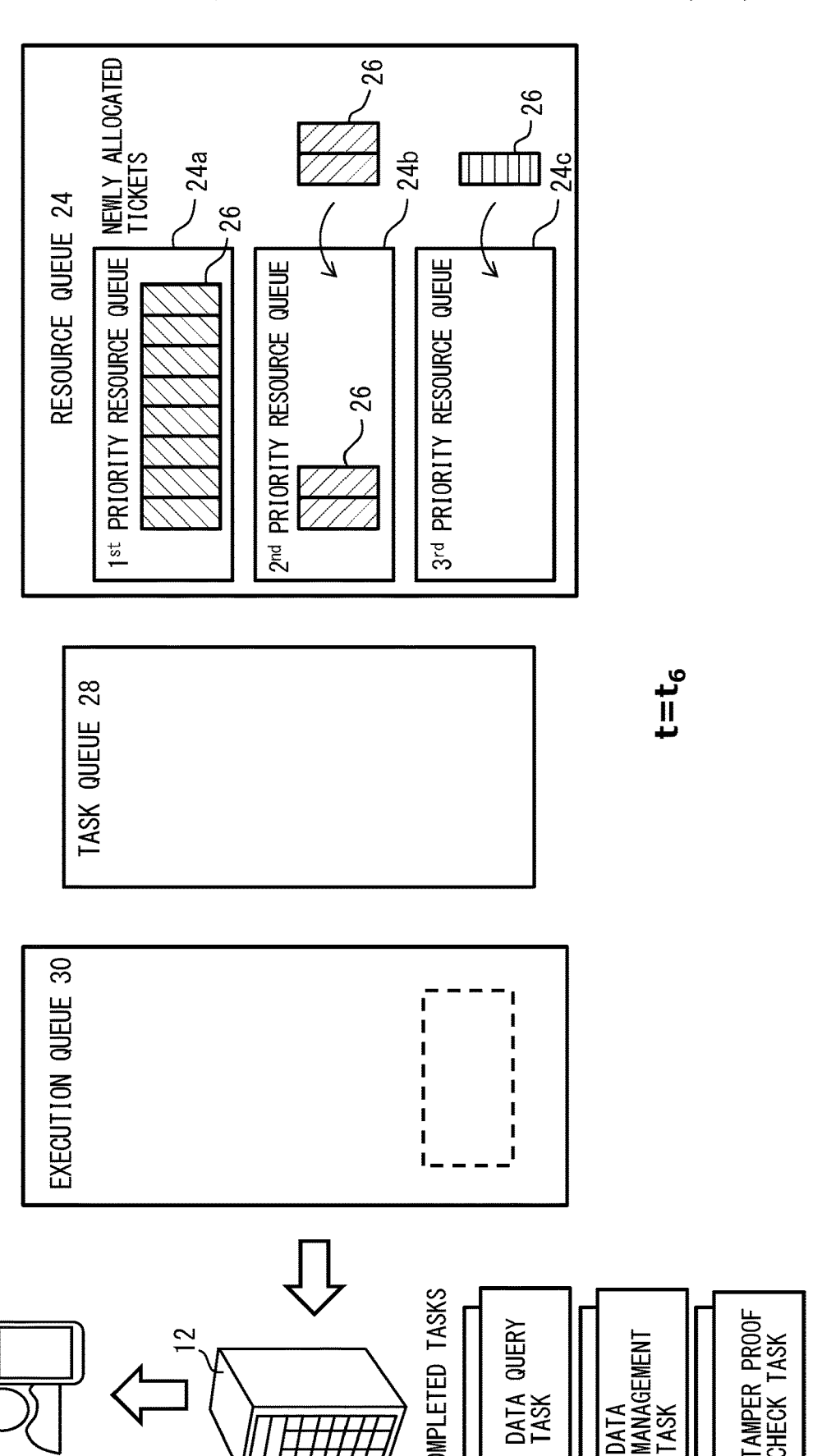

At S130, the management server 12 determines again whether the tamper proof check task satisfies S130 (i.e., whether the resource tickets 26 in the third priority resource queue 24*c* equal to or greater than the necessary resource tickets for the tamper proof check task). At this point, since the third priority resource queue 24*c* holds two resource tickets 26 as shown in FIGS. 3E, 3F (t=t₅) and 3G (t=t₆), the management server 12 determines that S130 is satisfied, and the tamper proof check task in the task queue is input in the execution task 30. Then, at S140, the management server 12 executes the tamper proof check task using two resource tickets 26 in the third priority resource queue 24*c*. By executing the tamper proof check task, tamper proof on the data stored on the blockchain can be confirmed. As a result, the third priority resource queue 24*c* has no resource ticket 26 as shown in FIG. 3F. In this way, the tamper proof check task having the lowest priority (i.e., the third priority) is executed after completing the other higher priority tasks. In other words, the management server 12 can preferentially execute the higher priority tasks (the data query tasks and the data management tasks) over the tamper proof check task. As described above, although the tamper proof check task has the lowest priority, the task can be executed without waiting for a long time. At S150, the resource tickets 26 are newly allocated to each resource queue 24*a*, 24*b*, 24*c* and the management server 12 determines whether all the tasks are completed at S160. In this case, since all the tasks have been already executed (S160: YES), the management server 12 ends the multi-task management process.

As described above, since the management server 12 assigns more resource tickets 26 for the task with higher priority than the task with lower priority, the task with higher priority can be preferentially executed. As a result, the user 24 who requested for a higher priority task can receive a quick response from the system 10, and thus user experience can be improved. As for the lower priority tasks such as the tamper proof check tasks, the management server 12 executes those tasks after completing other higher priority tasks. Since users 24 do not expect a quick response on these tasks, the management server 12 can use preferentially the computer resources for the higher priority tasks.

(Modifications to the Embodiment)

In the above-described embodiment, three types of tasks are described. However, other tasks in association with the data stored on the blockchain can be received and executed by the system. Furthermore, the data collected from the vehicle (i.e., the vehicle data) is stored on the blockchain in the embodiment. However, any other data can be stored on the blockchain. The management server can serve as a storage server as well. That is, a management server may be selected from the storage servers that form a blockchain network. In the above-described embodiment, the total computer resource of the processor is represented by fourteen resource tickets. However, the number of the resource tickets representing the total computer resource is net necessarily limited to fourteen and may be the number less than fourteen or the number more than fourteen.

The invention claimed is:

1. A method for managing a multi-task queue based on priority, the method comprising:

receiving a plurality of tasks relating to data stored on a blockchain from a user, each of the plurality of tasks requiring one or more necessary resource tickets to be executed by a processor, wherein each of the one or more necessary resource tickets comprise a predetermined measure of burden on the processor that is caused by executing a respective one of the plurality of tasks;

identifying a priority of each of the plurality of tasks;

periodically assigning one or more resource tickets for each of the plurality of tasks at a predetermined interval in accordance with the priority of each of the plurality of tasks; and periodically executing one or more of the plurality of tasks at the predetermined interval based on the one or more resource tickets assigned for the one or more of the plurality of tasks being equal to or more than the one or more necessary resource tickets, wherein an amount of the one or more resource tickets assigned for each of the plurality of tasks increases as the priority of each of the plurality of tasks increases, wherein the blockchain stores vehicle data collected from a plurality of vehicles, the plurality of tasks include a data query task for retrieving the vehicle data from the blockchain and a data management task for collecting the vehicle data from the plurality of vehicles and recording the vehicle data on the blockchain, and the data query task has a higher priority than the data management task.

2. The method according to claim 1, wherein the plurality of tasks include a first task having a first priority and a second task having a second priority that is lower than the first priority, and assigning one or more resource tickets includes assigning a number of resource tickets N for the first task and N/2 tickets for the second task.

3. The method according to claim 2, wherein the plurality of tasks further include a third task having a third priority that is lower than the second priority, and assigning one or more resource tickets includes assigning N/4 tickets for the third task.

4. The method according to claim 3, wherein

N=4.

5. The method according to claim 1, wherein the plurality of tasks further include a tamper proof check task for checking tamper proof of the vehicle data on the blockchain, and the tamper proof check task has a lower priority than the data management task.

6. A multi-task queue management system, comprising a storage server that is configured to store data on a blockchain; and a management server that is configured to manage a plurality of tasks relating to the data stored on the blockchain, wherein the management server includes at least one processor programmed to:

receive the plurality of tasks from a user, each of the plurality of tasks requiring one or more necessary resource tickets to be executed by the at least one processor, wherein each of the one or more necessary resource tickets comprise a predetermined measure of burden on the processor that is caused by executing a respective one of the plurality of tasks;

identify a priority of each of the plurality of tasks;

periodically assign one or more resource tickets for each of the plurality of tasks per unit time in accordance with the priority of each of the plurality of tasks; and periodically execute one or more of the plurality of tasks at a predetermined interval based on the one or more the resource tickets assigned for the one or more of the plurality of tasks being equal to or more than the one or more necessary resource tickets, wherein the at least one processor is further programmed to increase an amount of the one or more resource tickets assigned for each of the plurality of tasks as the priority of each of the plurality of tasks increases, wherein the storage server is configured to store vehicle data collected from a plurality of vehicles on the blockchain, the plurality of tasks include a data query task for retrieving the vehicle data from the blockchain and a data management task for collecting the vehicle data from the plurality of vehicles and recording the vehicle data on the blockchain, and the data query task has a higher priority than the data management task.

7. The multi-task queue management system according to claim 6, wherein the plurality of tasks include a first task having a first priority and a second task having a second priority that is lower than the first priority, and the at least one processor is further programmed to assign a number of resource tickets N for the first task and N/2 tickets for the second task.

8. The multi-task queue management system according to claim 7, wherein the plurality of tasks further include a third task having a third priority that is lower than the second priority, and the at least one processor is further programmed to assign N/4 tickets for the third task.

9. The multi-task queue management system according to claim 8, wherein

N=4.

10. The multi-task queue management system according to claim 6, wherein the plurality of tasks further include a tamper proof check task for checking tamper proof of the vehicle data on the blockchain, and the tamper proof check task has a lower priority than the data management task.

11. A non-transitory, computer readable, tangible storage medium storing a program for managing a multi-task queue, the program, when executed by at least one processor, causing the at least one processor to perform:

receiving a plurality of tasks relating to data stored on a blockchain from a user, each of the plurality of tasks requiring one or more necessary resource tickets to be executed by the at least one processor, wherein each of the one or more necessary resource tickets comprise a predetermined measure of burden on the processor that is caused by executing a respective one of the plurality of tasks;

identifying a priority of each of the plurality of tasks;

periodically assigning one or more resource tickets for each of the plurality of tasks per unit time in accordance with the priority of each of the plurality of tasks; and periodically executing one or more of the plurality of tasks at a predetermined interval based on the one or more resource tickets assigned for the one or more of the plurality of tasks being equal to or more than the one or more necessary resource tickets, wherein the program further causes the at least one processor to perform increasing an amount of the one or more resource tickets assigned for each of the plurality of tasks as the priority of each of the plurality of tasks increases, wherein the blockchain stores vehicle data collected from a plurality of vehicles, the plurality of tasks include a data query task for retrieving the vehicle data from the blockchain and a data management task for collecting the vehicle data from the plurality of vehicles and recording the vehicle data on the blockchain, and the data query task has a higher priority than the data management task.

12. The medium according to claim 11, wherein the plurality of tasks include a first task having a first priority and a second task having a second priority that is lower than the first priority, and the program further causes the at least one processor to perform assigning a number of resource tickets N for the first task and N/2 tickets for the second task.

13. The medium according to claim 12, wherein the plurality of tasks further include a third task having a third priority that is lower than the second priority, and the program further causes the at least one processor to perform assigning N/4 tickets for the third task.

14. The medium according to claim 13, wherein

N=4.

15. The medium according to claim 11, wherein the plurality of tasks further include a tamper proof check task for checking tamper proof of the vehicle data on the blockchain, and the tamper proof check task has a lower priority than the data management task.

* * * * *